A. Ohlenslager,
Steam-Boiler Attachment.
Nº 66,618.                    Patented July 9, 1867.
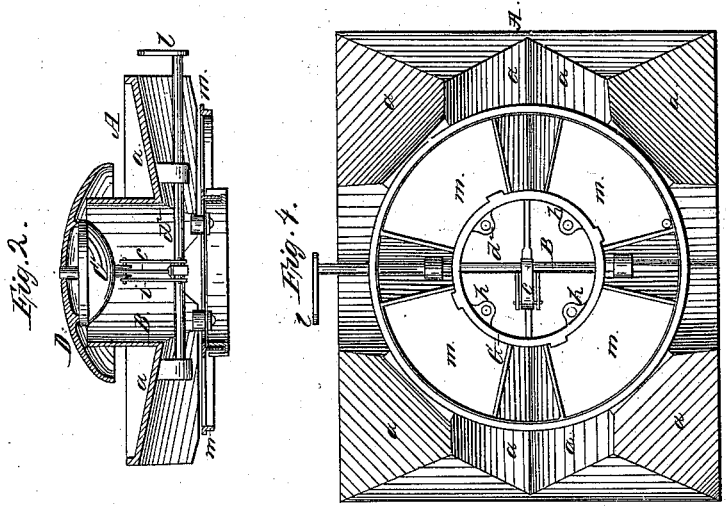
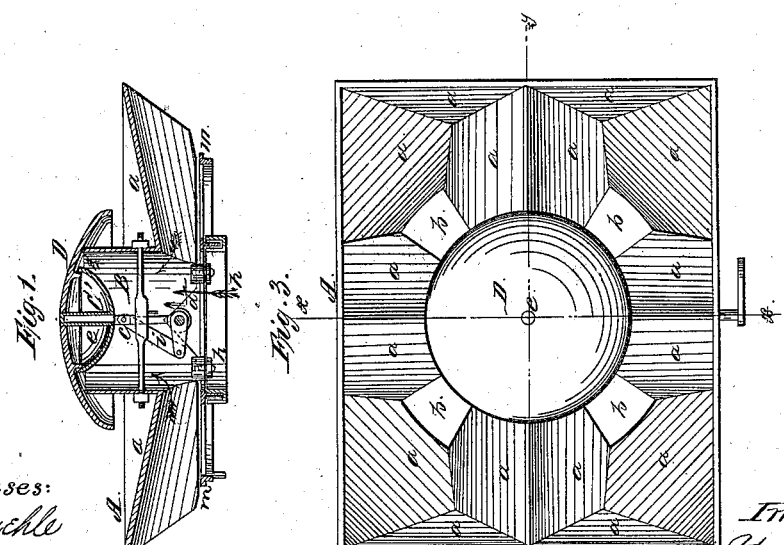
Witnesses:                                      Inventor:

United States Patent Office

ADOLPH OHLENSLAGER, OF JERSEY CITY, NEW JERSEY, ASSIGNOR TO HENRY L. LANSING AND GEORGE H. CHASE, OF BUFFALO, NEW YORK.

*Letters Patent No. 66,618, dated July 9, 1867.*

IMPROVED LOCOMOTIVE ASH-PAN.

*The Schedule referred to in these Letters Patent and making part of the same.*

TO ALL WHOM IT MAY CONCERN:

Be it known that I, ADOLPH OHLENSLAGER, of Jersey City, in the county of Hudson, and State of New Jersey, have invented a new and useful improvement in Ash-Pans for Locomotive Engines; and I do hereby declare that the following is a full, clear, and exact description thereof, sufficient to enable persons skilled in the art to make and use the same, reference being had to the accompanying drawings, making a part of this specification, I having assigned my whole interest in the said invention and improvement to Henry L. Lansing and George H. Chase, of the city of Buffalo, and State of New York.

The nature of this invention consists, first, in an iron pan or box, provided with openings through the bottom, and a horizontal rotary plate, which has corresponding openings and solid portions, which may be rotated in a manner to uncover the openings in the bottom of the pan, to dump or discharge the ashes and cinders, and then closed so as to practically form a solid bottom and prevent the ashes and cinders from scattering upon the track, and thereby making an air-tight bottom; second, in the construction of central draught-flue, passing centrally through the ash-pan; third, in the construction, application, and use of an adjustable valve-cap or damper in connection with the central flue, which valve-cap has two distinct features, to wit, a saucer-shaped cap, which may be raised and lowered in a manner to open and close the draught-flue, making it air-tight when shut, and an inner inverted conical cap for spreading the incoming air and directing it equally over the periphery of the valve-cap to the fire; fourth, in dividing the ash-pan into four or more compartments having inclined sides sloping downwardly to the openings through the bottom of the pan; fifth, in arranging a rock-shaft horizontally and passing in the recesses formed under the inclined sides, in combination with a vertical stem and link-connection, as a means of raising and lowering the valve-cap. In the accompanying drawings—

Figure I is a vertical section of my improved ash-pan in one diameter taken in the line $x\,x$, Fig. III.

Figure II is a vertical section at right angles to that of Fig. I, taken in the line $y\,y$, Fig. III.

Figure III is a top view complete.

Figure IV is a bottom view.

Letters of like name and kind refer to like parts in each of the figures.

A represents a locomotive ash-pan, which is made of cast iron and fitted to be supported under the fire-grate of a locomotive to catch and hold the ashes and cinders which drop from the fire. It is rectangular in form, and is divided into four or more compartments, having sloping sides $a\,a$, so that the ashes and cinders which accumulate therein may easily slide down the inclined sides and through the openings in the bottom, when the openings are uncovered. Centrally within the ash-pan is placed an air-supply or draught-flue, B. This flue may be cast with the pan, joining the compartments at the lower inner ends thereof. The openings through the bottom of the pan are between the compartments, and are shown at $b\,b$. On the bottom of the ash-pan is placed a circular revolving disk-plate or gate, $m$, which has alternate openings and solid metal corresponding with the openings through the bottom of the pan, so that when the plate is revolved a quarter turn (more or less) in one direction the openings in the plate are made to coincide with the openings in the bottom of the pan, allowing the ashes and cinders to escape freely, and when revolved a quarter turn (more or less) in the opposite direction the solid parts of the plate are made to close the openings, so that no ashes or cinders can escape, and also making it air-tight. This plate is connected to the bottom of the pan by means of the flange-ring G and screw-bolts $h$. $c$ is a vertical stem or rod, which is connected with the horizontal rock-shaft $d^2$ and with the valve-cap D. There is a jointed link-connection, $i$, between the valve-stem $c$ and the rock-shaft. The valve-cap D is fastened to the top of the stem $c$ and is moved up and down thereby, and shuts down air-tight on the top of the draught-flue. There is an inner inverted conical cap, C', which has a hollow stem, $e$, slipping over the valve-stem $c$ in a manner to fasten it to the valve-cap. This is for the purpose of spreading the incoming air and prevent it from lodging in the top of the valve-cap and directing it equally over the periphery of the valve-cap to the fire. The rock-shaft is worked by the crank $l$, by means of which the valve-cap may be raised and lowered and adjusted and opened little or more, so as to admit more or less air to feed the fire, as may be desired. It is known to those acquainted with running coal-burning locomotive engines over railroads that the ash-pans heretofore constructed are liable to drop fire and cinders upon the track, setting fire to the road and other property, thereby causing great damage and destruction of property. It is also known that it costs much time, labor, and money to clean out the ash-pans. My improvement affords a remedy for these evils. All the ashes and cinders which drop into the ash-pan while the locomotive is running are retained there (without the least scattering) until the engine arrives at the end of the trip, and then the ashes, cinders, &c., are easily and quickly dumped or discharged through the openings in the bottom of the pan (by a quarter turn of the plate $m$) into a pit prepared for that purpose without expense or delay.

What I claim as my invention, and desire to secure by Letters Patent, is—

1. A locomotive ash-pan, provided with openings $b\ b$ through the bottom and a corresponding gate or disk-plate, $m$, which may be moved and placed in a manner to entirely close such openings when the locomotive is running and opened for the discharge of the ashes and cinders at the proper time and place, substantially as and for the purposes set forth.

2. An ash-pan for locomotives divided into compartments having sloping sides $a\ a$, for the purposes and substantially as described.

3. The draught-flue B, passing centrally through the ash-pan and the adjustable valve-cap D and inner inverted conical cap D′, arranged and operating for the purposes and substantially as described.

4. The rock-shaft $d^2$, arranged in the recesses formed under the inclined sides, in combination with the vertical stem $c$ and connecting-link $i$, as a means of raising and lowering the valve-cap, substantially as described.

A. OHLENSLAGER.

Witnesses:
WM. F. MCNAMARA,
E. WESTON.